United States Patent
Donnellan et al.

(10) Patent No.: US 8,429,651 B2
(45) Date of Patent: Apr. 23, 2013

(54) ENABLEMENT AND ACCELERATION OF LIVE AND NEAR-LIVE MIGRATION OF VIRTUAL MACHINES AND THEIR ASSOCIATED STORAGE ACROSS NETWORKS

(75) Inventors: Sean Donnellan, Gaertringen (DE); Chitra Dorai, Chappaqua, NY (US); Anees A. Shaikh, Yorktown Heights, NY (US); Kunwadee Sripanidkulchai, White Plains, NY (US); Jie Zheng, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 12/690,552

(22) Filed: Jan. 20, 2010

(65) Prior Publication Data

US 2011/0179415 A1    Jul. 21, 2011

(51) Int. Cl.
*G06F 9/455* (2006.01)
*G06F 9/46* (2006.01)

(52) U.S. Cl.
USPC ............................................. 718/1; 718/105

(58) Field of Classification Search ............. 718/1, 100, 718/105
See application file for complete search history.

(56) References Cited

U.S. PATENT DOCUMENTS

| | | | | |
|---|---|---|---|---|
| 7,607,129 | B2* | 10/2009 | Rosu et al. | 718/1 |
| 8,108,912 | B2* | 1/2012 | Ferris | 726/3 |
| 2008/0184229 | A1* | 7/2008 | Rosu et al. | 718/1 |
| 2009/0172666 | A1* | 7/2009 | Yahalom et al. | 718/1 |
| 2009/0300635 | A1* | 12/2009 | Ferris | 718/104 |
| 2010/0011368 | A1* | 1/2010 | Arakawa et al. | 718/104 |
| 2010/0050172 | A1* | 2/2010 | Ferris | 718/1 |
| 2010/0205252 | A1* | 8/2010 | Dorai et al. | 709/205 |
| 2010/0318608 | A1* | 12/2010 | Huang et al. | 709/205 |
| 2010/0318609 | A1* | 12/2010 | Lahiri et al. | 709/205 |
| 2010/0322255 | A1* | 12/2010 | Hao et al. | 370/398 |
| 2010/0332629 | A1* | 12/2010 | Cotugno et al. | 709/221 |
| 2011/0055377 | A1* | 3/2011 | Dehaan | 709/224 |
| 2011/0075667 | A1* | 3/2011 | Li et al. | 370/392 |
| 2011/0075674 | A1* | 3/2011 | Li et al. | 370/401 |
| 2011/0119668 | A1* | 5/2011 | Calder et al. | 718/1 |
| 2011/0153697 | A1* | 6/2011 | Nickolov et al. | 707/827 |

* cited by examiner

*Primary Examiner* — Van Nguyen
(74) *Attorney, Agent, or Firm* — Yee & Associates, P.C.; Louis J. Percello

(57) ABSTRACT

A virtual machine is migrated between a source cloud and a destination cloud. A temporary storage is mounted to a partition management firmware of the source cloud and to a partition management firmware of the destination cloud. A first storage location migration migrates the virtual machine from the source cloud to the at least one temporary storage. A second storage location migration migrates the virtual machine from the at least one temporary storage to final destination storage of the destination cloud. The temporary storage is then unmounted from the partition management firmware of the source cloud and from the partition management firmware of the destination cloud.

25 Claims, 7 Drawing Sheets

ENABLEMENT AND ACCELERATION OF LIVE AND NEAR-LIVE MIGRATION OF VIRTUAL MACHINES AND THEIR ASSOCIATED STORAGE ACROSS NETWORKS

BACKGROUND

1. Field

The disclosure relates generally to a computer implemented method, a data processing system, and a computer readable storage media having a computer program products encoded thereon. More specifically, the disclosure relates generally to a computer implemented method, a data processing system, and a computer readable storage media having a computer program products encoded thereon for the enablement and acceleration of live and near-live migration of virtual machines and their associated storage across networks.

2. Description of the Related Art

Increasingly large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a subset of the platform's resources. These platform allocable resources include one or more logically distinct processors and their interrupt management area, regions of system memory, and input/output (I/O) adapter bus slots. The partition's resources are represented by the platform's firmware to the operating system image.

Each distinct operating system or image of an operating system running within a platform is protected from each other, such that software errors on one logical partition cannot affect the correct operation of any of the other partitions. This protection is provided by allocating a logically disjointed set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system or each different operating system, directly controls a distinct set of allocable resources within the platform.

With respect to hardware resources in a logical partitioned data processing system, these resources are shared dis-jointly among various partitions. These resources may include, for example, input/output (I/O) adapters, memory DIMMs, non-volatile random access memory (NVRAM), and hard disk drives. Each partition within a logical partitioned data processing system may be booted and shut down over and over without having to power-cycle the entire data processing system.

Service availability is a key concern for users when considering deploying mission-critical services on logical partitioned virtual data centers, or clouds. Today when cloud providers need to perform fixes or maintenance on their physical infrastructure, they inform users to shutdown and reattach their instances to a different location. This incurs service down time. Additionally, when there is resource contention on the cloud, customers' services may suffer from poorer performance and availability. There are many additional scenarios in which cloud users may see impact on their services.

Live migration is a powerful virtualization technology that data center or cloud providers can themselves leverage or provide to cloud customers to increase SLAs by migrating running virtual machines from one physical location to a different physical location with little to no impact on service availability, as needed owing to problem avoidance, operational considerations, or for better delivery economics.

SUMMARY

According to one illustrative embodiment, a computer implemented method migrates a virtual machine between a source cloud and a destination cloud. At least one temporary storage is mounted to a partition management firmware of the source cloud and to a partition management firmware of the destination cloud. A first storage location migration is performed migrating the virtual machine from the source cloud to the at least one temporary storage. A second storage location migration is performed migrating the virtual machine from the at least one temporary storage to final destination storage of the destination cloud. The at least one temporary storage is then unmounted from the partition management firmware of the source cloud and from the partition management firmware of the destination cloud.

DETAILED DESCRIPTION

Figure 1:
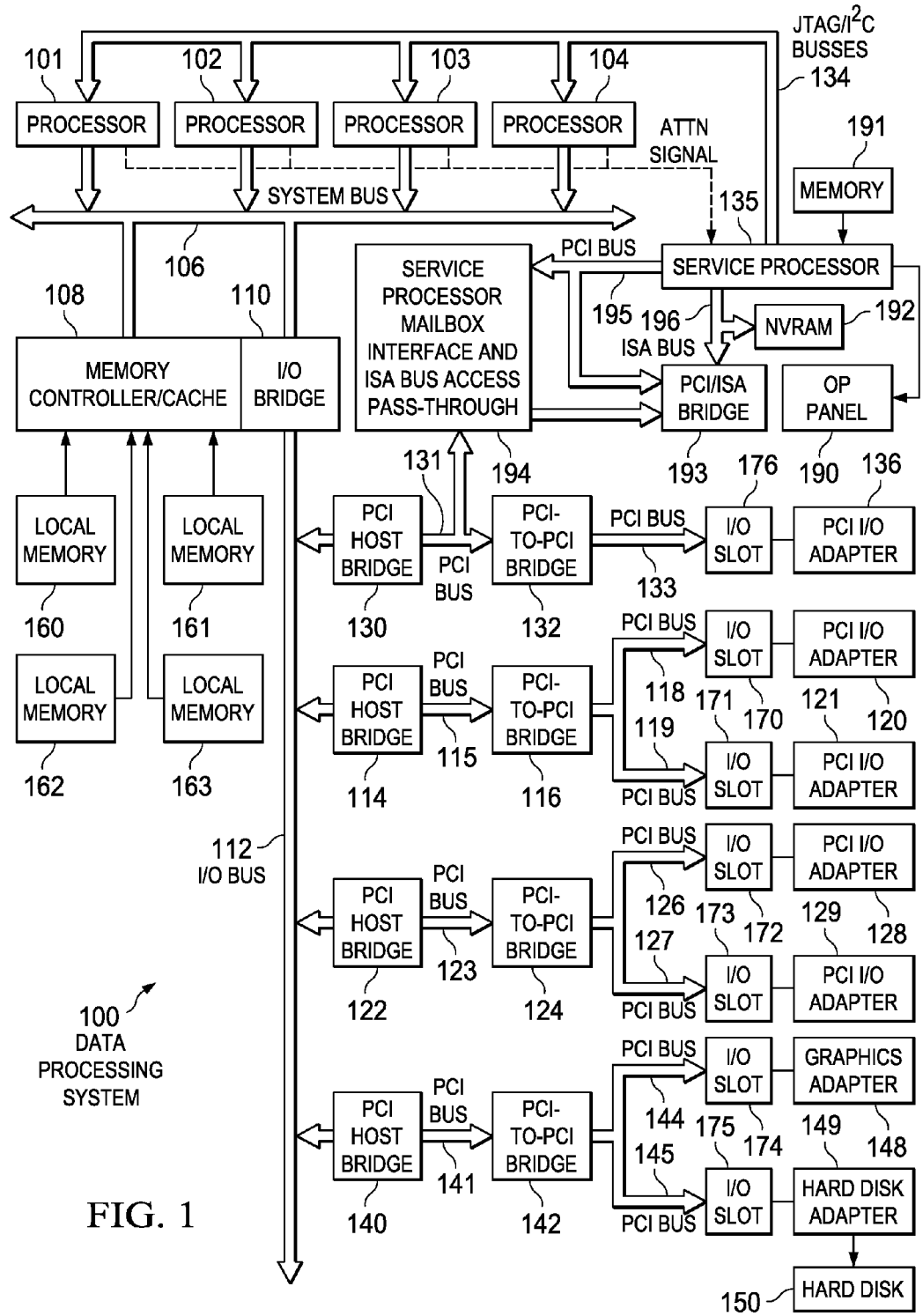
FIG. 1 is a block diagram of a data processing system in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular with reference to FIG. 1, a block diagram of a data processing system in which illustrative embodiments may be implemented is depicted. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through 194 and PCI-to-PCI bridge 132. Service processor mailbox interface and ISA bus access pass-through 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101, 102, 103, and 104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I²C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to, or in place of, the hardware depicted. The depicted example is not meant to imply architectural limitations with respect to illustrative embodiments.

Figure 2:
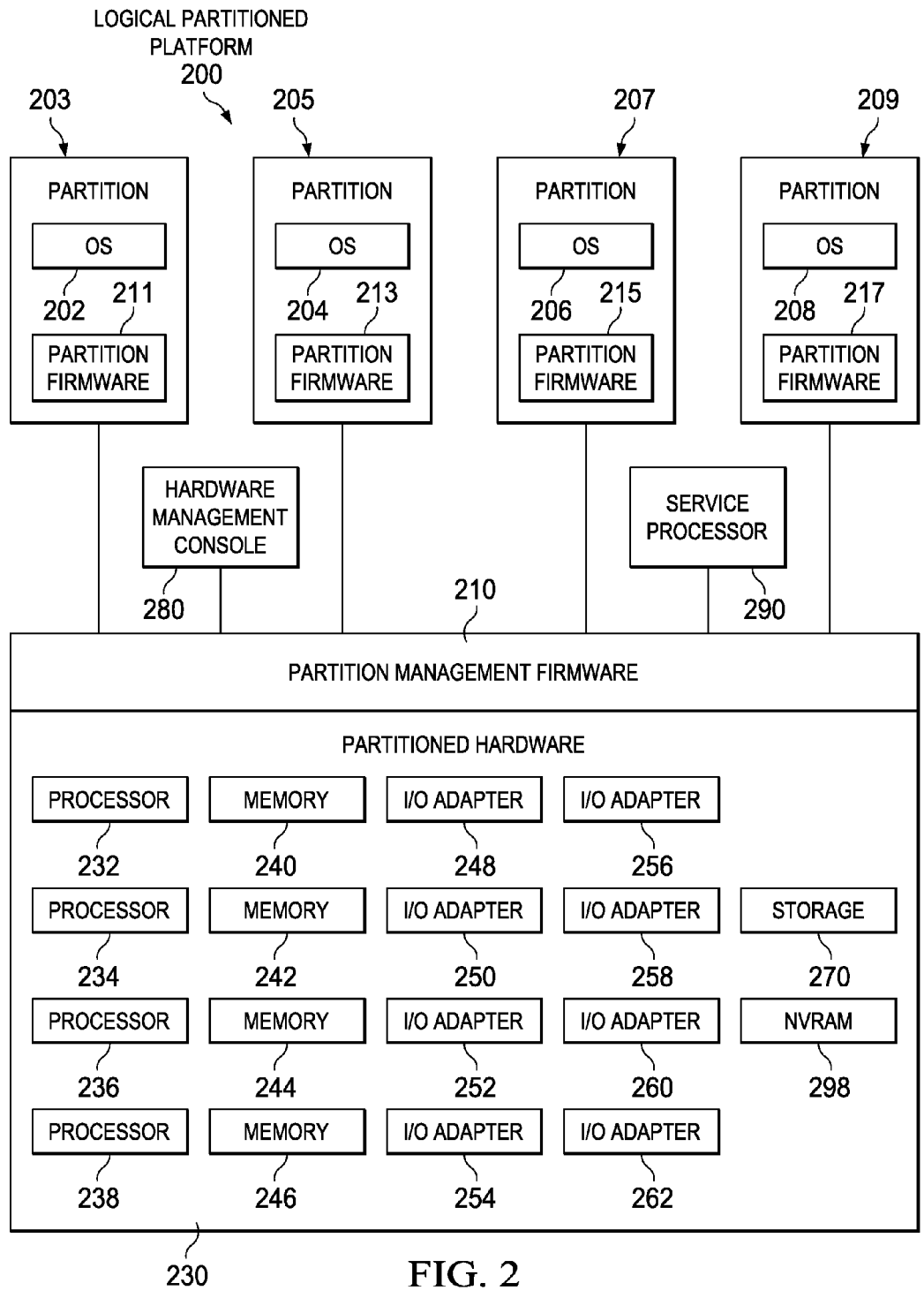
FIG. 2 is a block diagram of an exemplary logical partitioned platform in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial bootstrap code, IEEE-1275 Standard Open Firmware, and runtime abstraction software (RTAS), which is available from International Business Machines Corporation. When partitions 203, 205, 207, and 209 are instantiated, a copy of bootstrap code is loaded onto partitions 203, 205, 207, and 209 by platform firmware 210. Thereafter, control is transferred to the bootstrap code with the bootstrap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and a storage unit 270. Each of processors 232, 234, 236, and 238, memories 240, 242, 244, and 246, NVRAM storage 298, and I/O adapters 248, 250, 252, 254, 256, 258, 260, and 262 may be assigned to one or more of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The illustrative embodiments describe a computer implemented method for migrating a virtual machine between a source cloud and a destination cloud. At least one temporary storage is mounted to a partition management firmware of the source cloud and to a partition management firmware of the destination cloud. A first storage location migration is performed migrating the virtual machine from the source cloud to the at least one temporary storage. A second storage location migration is performed migrating the virtual machine from the at least one temporary storage to final destination storage of the destination cloud. The at least one temporary storage is then unmounted from the partition management firmware of the source cloud and from the partition management firmware of the destination cloud.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Figure 3:
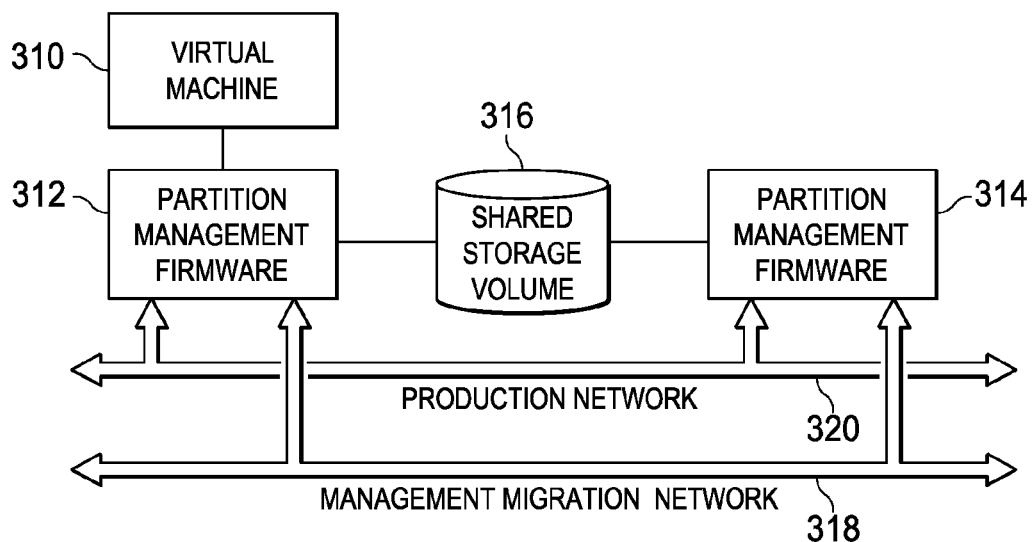
FIG. 3 is a block diagram of a memory state migration within a logical partitioned platform according to an illustrative embodiment.

Referring now to FIG. 3, a block diagram of a memory state migration within a logical partitioned platform is depicted according to an illustrative embodiment. The memory, register, and configuration files of virtual machine 310 are migrated from partition management firmware 312 to partition management firmware 314 while virtual machine 310 is running. Virtual machine 310 is an image of an operating system, such as one of operating systems 202, 204, 206, 208 of FIG. 2, running within a platform, such as one of partitions 203, 205, 207, and 209 of FIG. 2.

To begin the migration, partition management firmware 312 records the entire state of a virtual machine 310 in a set of files. Partition management firmware 312 then stores that set of files on shared storage volume 316. Shared storage volume 316 is a storage, such as hard disk 150 of FIG. 1 that is accessible by both partition management firmware 312 and partition management firmware 314. Shared storage volume 316 can be, for example, but is not limited to, a Storage Area Network (SAN) volume, a Fiber Channel, an Internet Small Computer System Interface (iSCSI) or a Network Attached Storage (NAS).

Partition management firmware 312 is connected to both management/migration network 318 and to production network 320. Partition management firmware 312 then transfers the active memory and execution state of virtual machine 310 over management/migration network 318 to partition management firmware 314. Partition management firmware 314 installs the active memory and execution state of virtual machine 310 in a new partition under the control of partition management firmware 314. Partition management firmware 312 tracks any on-going memory transactions in a bitmap.

Once partition management firmware 312 has copied the entire memory and system state to partition management firmware 312, partition management firmware 312 suspends operation of virtual machine 310 within the original partition, and copies the bitmap to the new partition. Partition management firmware 314 then resumes operation of virtual machine 310 within the new partition. Partition management firmware 314 then notifies the network router of the new physical location of the virtual Media Access Control address for virtual machine 310 to preserve network connections and identity.

Figure 4:
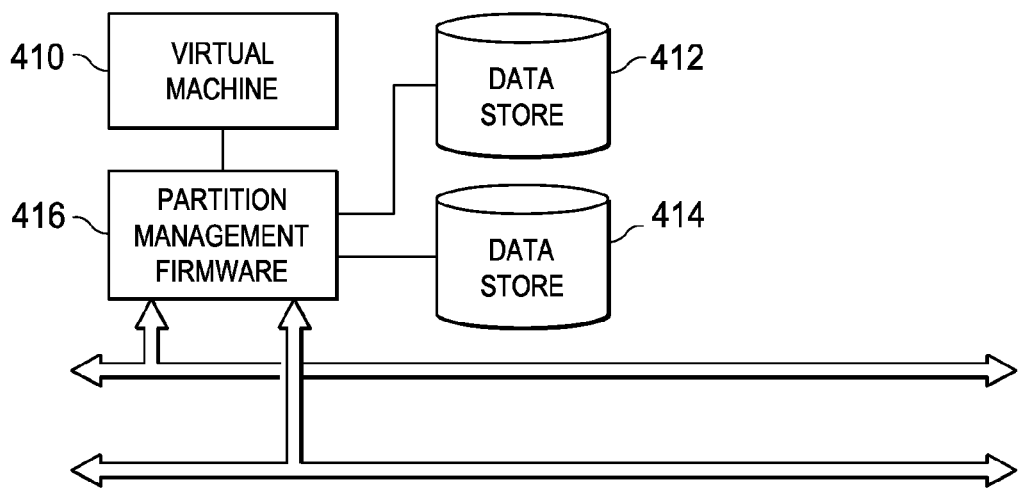
FIG. 4 is a block diagram of a storage location migration within a logical partitioned platform according to an illustrative embodiment.

Referring now to FIG. 4, a block diagram of a storage location migration within a logical partitioned platform is depicted according to an illustrative embodiment. The disk files of virtual machine 410 are migrated from data store 412 to data store 414 while virtual machine 410 is running. Virtual machine 410 is an image of an operating system, such as one of operating systems 202, 204, 206, 208 of FIG. 2, running within a platform, such as one of partitions 203, 205, 207, and 209 of FIG. 2.

Partition management firmware 416 begins the storage location migration by moving the "home directory" of virtual machine 310 from data store 412 to data store 414. The home directory contains metadata about the virtual machine 410, such as, but not limited to, virtual machine configuration, virtual machine swap files and virtual machine log files.

After relocating the home directory, partition management firmware 416 copies the contents of the virtual machine storage disk file located on data store 412 to data store 414. During this migration process, partition management firmware 416 maintains data integrity of the virtual machine storage disk file by utilizing a "changed block tracking" scheme. A changed-block tracking module records regions of the virtual machine storage disk file that are written to during a first migration iteration from data store 412 to data store 414. After this initial iteration, partition management firmware 416 queries the changed block tracking and then performs at least one subsequent iteration from data store 412 to data store 414. During subsequent iterations, partition management firmware 416 copies those regions that changed during the previous iteration.

Once the migration process is complete, virtual machine 410 is suspended and then quickly resumed. This suspension allows virtual machine 410 to begin using the virtual machine home directory and disk file on data store 414.

Figure 5:
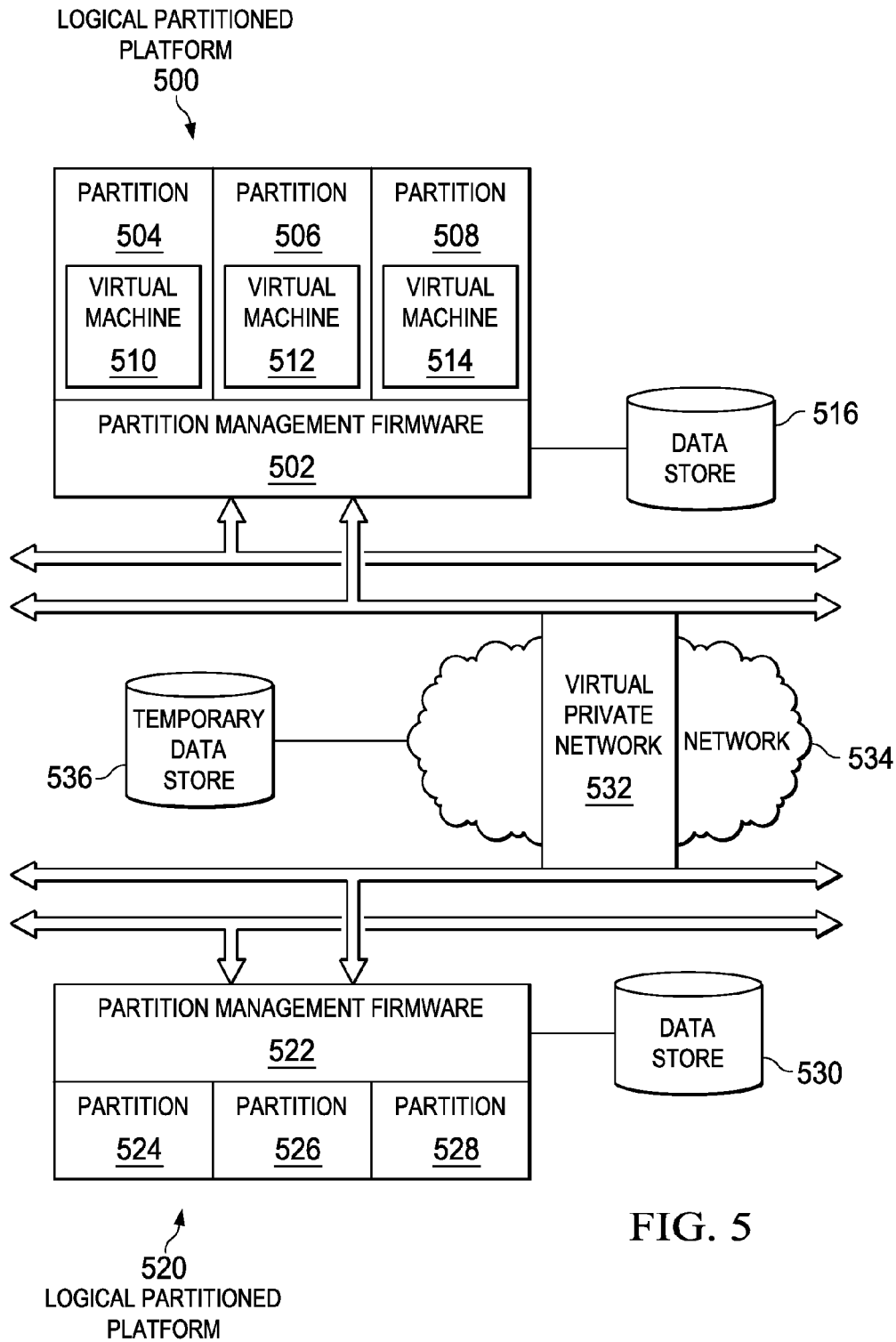
FIG. 5 is a dataflow diagram for live migrations of virtual machines between separate clouds utilizing a temporary shared storage according to an illustrative embodiment.

Referring now to FIG. 5, a dataflow diagram is shown for live migrations of virtual machines between separate clouds utilizing a temporary shared storage according to an illustrative embodiment. Logical partitioned platforms 500 and 520 are logical partitioned platforms such as logical partitioned platform 200 of FIG. 2.

Logical partitioned platform 500 includes partition management firmware 502, which can be partition management firmware 210 of FIG. 2. A logical partitioned platform 500 includes partitions 504-508. Each of partitions 504-508 provides a platform for running one of virtual machines 510-514.

Logical partitioned platform 500 is connected to data store 516. Data store 516 is a storage device such as shared storage volume 316 of FIG. 3. Data store 516 can also be a storage area network (SAN), or a network attached storage (NAS). Data store 516 stores contents of the virtual machine storage disk files for virtual machines 510-514.

Logical partitioned platform 520 includes partition management firmware 522, which can be partition management firmware 210 of FIG. 2. A logical partitioned platform 520 is located at a separate cloud than is logical partitioned platforms 500. A logical partitioned platform 520 includes partitions 524-528. Each of partitions 524-528 provides a platform to which one of virtual machines 510-514 will be migrated.

Logical partitioned platform 500 is connected to data store 530. Data store 530 is a storage device such as shared storage volume 316 of FIG. 3. Data store 530 can also be a storage area network (SAN), or a network attached storage (NAS). Data store 530 stores contents of the virtual machine storage disk files for virtual machines 510-514 after virtual machines 510-514 are migrated to logical partitioned platform 520.

Virtual private network 532 is a virtual private network that is established between logical partitioned platform 500 and logical partitioned platform 520. In one illustrative embodiment, virtual private network 532 is a layer 3 tunnel virtual private network that communicates between logical partitioned platform 500 and logical partitioned platform 520 over network 534. Network 534 is a wide area network. Network 534 can be the internet. In one illustrative embodiment, virtual private network 532 is a layer 2 emulation that communicates between logical partitioned platform 500 and logical partitioned platform 520 over network 534.

Temporary data store 536 is a shared storage that is used to facilitate the migration of virtual machines 510-514 over network 534. Temporary data store 536 is mounted as shared storage to both partition management firmware 502 and partition management firmware 522. Temporary data store 536 is accessible to both partition management firmware 502 and partition management firmware 522. Temporary data store 536 is configured by a host system, which can be either logical partitioned platform 500 or logical partitioned platform 520, to have enough resources to enable the migration. Temporary data store 536 can enable migrations of multiple virtual machines. In one illustrative embodiment, temporary data store 536 is a network file system server image.

Various optimizations can be introduced to improve migration over network 534. For example, a guest operating system can be used by the file system to enable more efficient compression. Data compression can be performed while transferring the virtual machine disk image and machine memory over network 534. Image duplication can be performed across multiple images while transferring the disk image over network 534. Virtual machine disks to copy over network 534 can be reordered to take advantage of better compression or deduplication.

Figure 6:
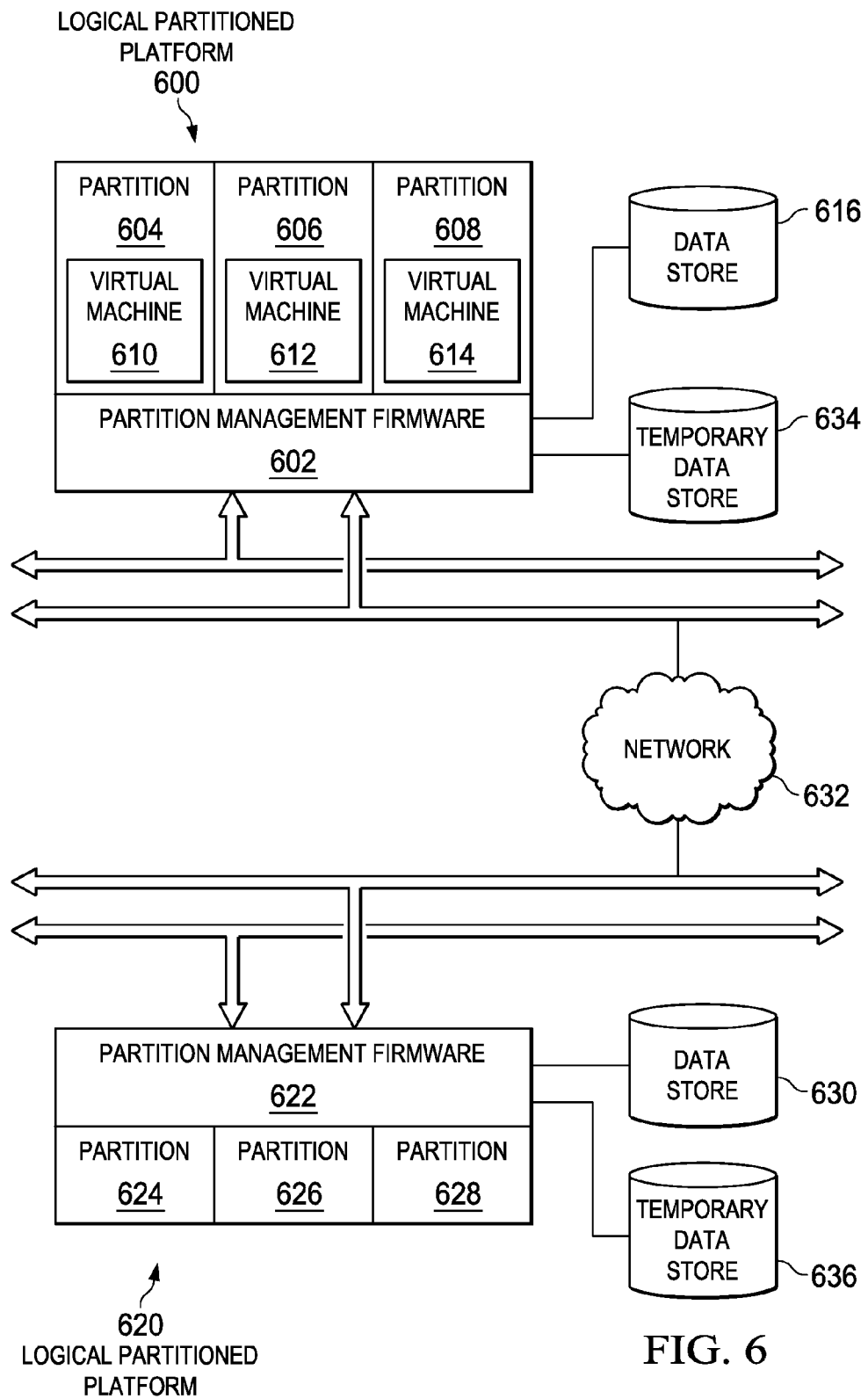
FIG. 6 is a dataflow diagram shown for live migrations of virtual machines between separate clouds utilizing a plurality of temporary shared storages according to an illustrative embodiment.

Referring now to FIG. 6, a dataflow diagram is shown for live migrations of virtual machines between separate clouds utilizing a plurality of temporary shared storages according to an illustrative embodiment. Logical partitioned platforms 600 and 620 are logical partitioned platforms such as logical partitioned platform 200 of FIG. 2.

Logical partitioned platform 600 includes partition management firmware 602, which can be partition management firmware 210 of FIG. 2. A logical partitioned platform 600 includes partitions 604-608. Each of partitions 604-608 provides a platform for running one of virtual machines 610-614.

Logical partitioned platform 600 is connected to data store 616. Data store 616 is a storage device such as shared storage volume 316 of FIG. 3. Data store 616 can also be a storage area network (SAN), or a network attached storage (NAS). Data store 616 stores contents of the virtual machine storage disk files for virtual machines 610-614.

Logical partitioned platform 620 includes partition management firmware 622, which can be partition management firmware 210 of FIG. 2. Logical partitioned platform 620 is located at a separate cloud than is logical partitioned platform 600. Logical partitioned platform 620 includes partitions 624-628. Each of partitions 624-628 provides a platform to which one of virtual machines 610-614 will be migrated.

Logical partitioned platform 620 is connected to data store 630. Data store 630 is a storage device such as shared storage volume 316 of FIG. 3. Data store 630 can also be a storage area network (SAN), or a network attached storage (NAS). Data store 630 stores contents of the virtual machine storage disk files for virtual machines 610-614 after virtual machines 610-614 are migrated to logical partitioned platform 620.

Logical partitioned platform 600 and logical partitioned platform 620 communicate over network 632. Network 632 is a wide area network. Network 632 can be the internet.

Temporary data store 634 and temporary data store 636 are temporary storages that are used to facilitate the migration to virtual machines 610-614 over network 632. Temporary data store 634 is mounted to partition management firmware 602. Temporary data store 636 is mounted to partition management firmware 622. In one illustrative embodiment, temporary data store 634 and temporary data store 636 are network file system server images.

Asynchronous mirroring is then set up between temporary data store 634 and temporary data store 636. During asynchronous mirroring, a staging area is established. Write-requests from partition management firmware 602 for one of virtual machines 610-614 are first delivered to this staging area. The data written to the staging area is then written to both the source storage, and the destination storage, here temporary data store 636. The asynchronous mirroring synchronizes files and directories between the source storage, temporary data store 634, and the destination storage, temporary data store 636.

Various optimizations can be introduced to improve migration over network 632. For example, synchronization can be performed by caching disk block write operations on a network file system image in order to avoid full disk scans. Image deduplication can be performed across multiple images while transferring a disk image across network 632. Virtual machine disks to copy over network 632 can be reordered to take advantage of better compression or deduplication.

Figure 7:
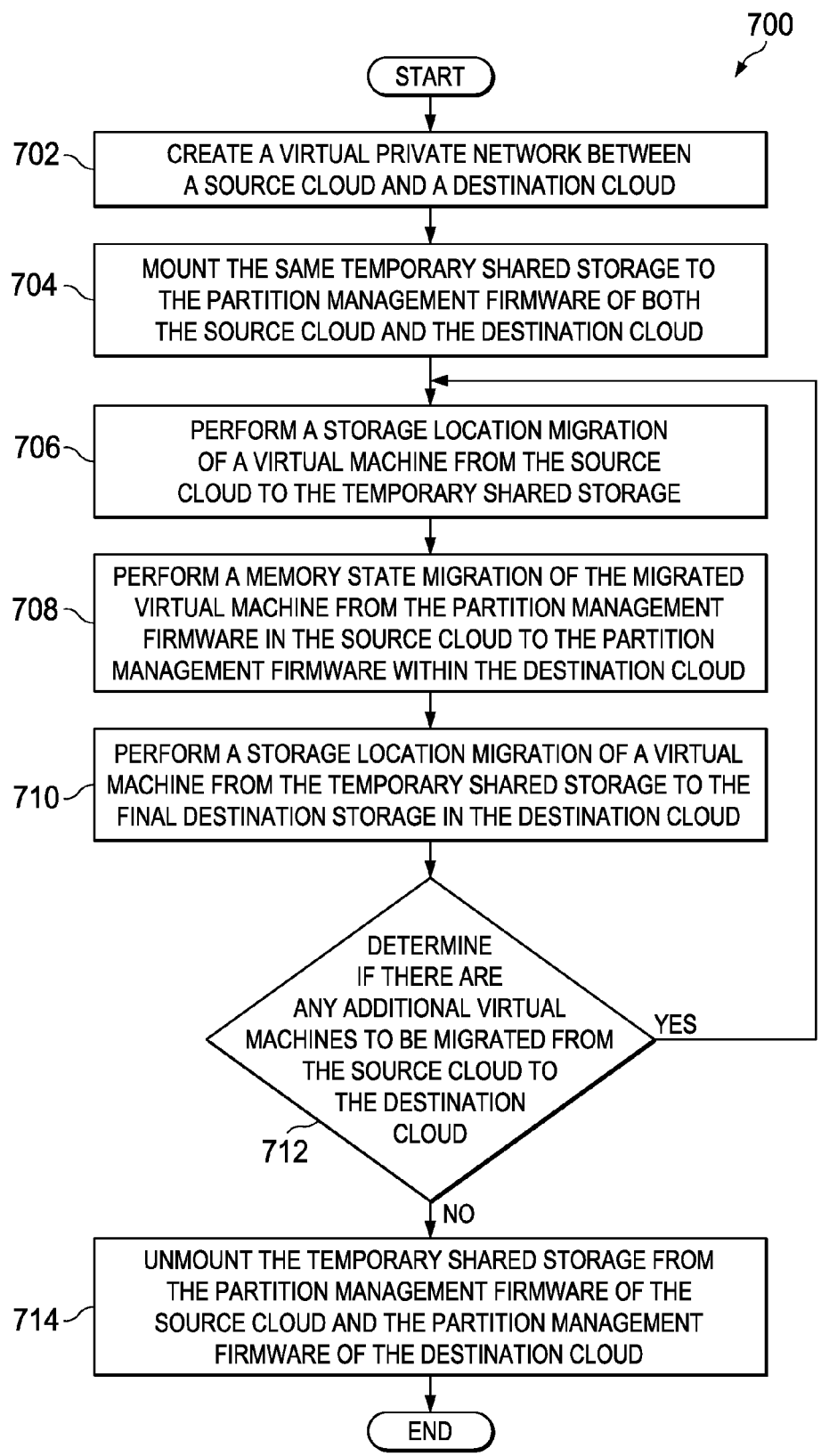
FIG. 7 is flowchart of the processing steps for live migrating of a virtual machine from a source cloud utilizing a temporary shared storage according to an illustrative embodiment.

Referring now to FIG. 7, flowchart of the processing steps for live migration of a virtual machine from a source cloud utilizing a temporary shared storage is shown according to an illustrative embodiment. Process 700 is across the platforms of a plurality of logical partitioned platforms, such as logical partitioned platform 500 and logical partitioned platform 520 of FIG. 5.

Process 700 begins by creating a virtual private network between a source cloud and a destination cloud (step 702). The source cloud can be logical partitioned platform 500 of FIG. 5. The destination cloud can be logical partitioned platform 520 of FIG. 5.

Process 700 then mounts the same temporary shared storage to the partition management firmware of both the source cloud and the destination cloud (step 704). The temporary shared storage can be temporary data store 536 of FIG. 5. In one illustrative embodiment, the temporary shared storage is a network file system server image physically located at the destination cloud.

Process 700 then performs a storage location migration of a virtual machine from the source cloud to the temporary shared storage (step 706). The disk files of the virtual machine being transferred are migrated from a data store on the source cloud to the temporary shared storage while the transferred virtual machine is running. The storage location migration can be performed according to a method described in FIG. 4.

Responsive to completing the storage location migration, process 700 performs a memory state migration of the migrated virtual machine from the partition management firmware in the source cloud to the partition management firmware within the destination cloud (step 708). The memory, register, and configuration files of the migrated virtual machine are migrated from the partition management firmware in the source cloud to the partition management firmware of the destination cloud. This migration occurs while the migrated virtual machine is running. The memory state migration can be performed according to a method described in FIG. 3.

Responsive to completing the memory state migration, process 700 then performs a storage location migration of a virtual machine from the temporary shared storage to the final destination storage in the destination cloud. In one illustrative embodiment, the final destination storage is local storage attached to a logical partitioned platform in the destination cloud (step 710). The disk files of the virtual machine being transferred are migrated from the temporary shared storage to partition of the data store on the destination cloud. The migration occurs while the transferred virtual machine is running. The storage location migration can be performed according to a method described in FIG. 4.

Process 700 then determines if there are any additional virtual machines to be migrated from the source cloud to the destination cloud (step 712). If source cloud contains additional virtual machines to be migrated to the destination cloud ("yes" at step 712), process 700 iterates back to step 706 to migrate the remaining clouds. Otherwise, process 700 proceeds to step 714.

Responsive to determining that the source cloud does not contain additional virtual machines to be migrated to the destination cloud, ("no" at step 712), process 700 unmounts the temporary shared storage from the partition management firmware of the source cloud and the partition management firmware of the destination cloud (step 714). Process 700 then removes any remaining temporary storage image from the destination cloud (step 714). In one illustrative embodiment, the temporary shared storage is a network file system server image physically located at the destination cloud. Process 700 removes this network file system server image. Process 700 terminates thereafter.

Figure 8:
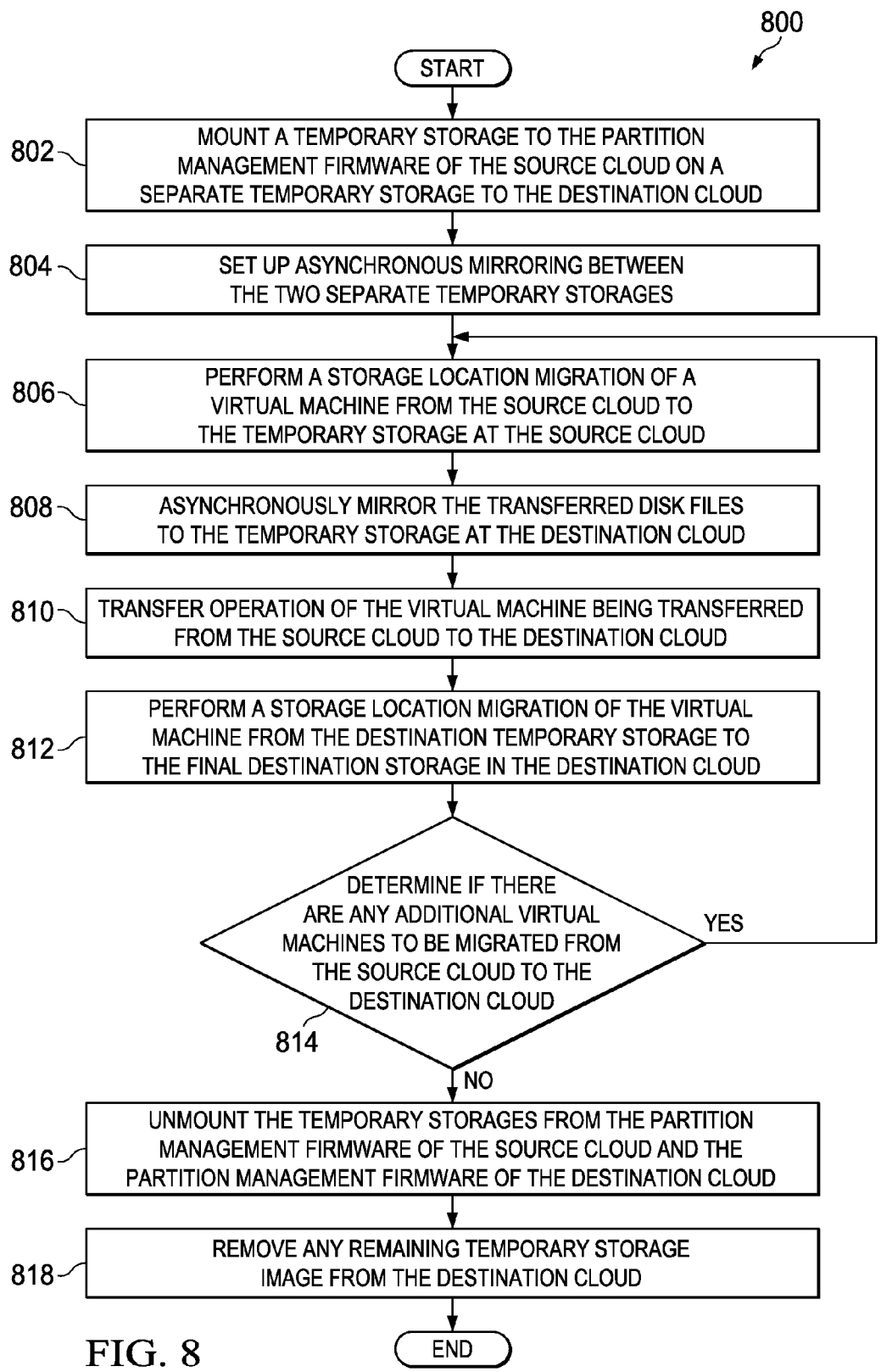
FIG. 8 is a flowchart of the processing steps for near-live migration of a virtual machine from a source cloud utilizing a plurality of temporary shared storages according to an illustrative embodiment.

Referring now to FIG. 8, a flowchart of the processing steps for near-live migration of a virtual machine from a source cloud utilizing a plurality of temporary shared storages is shown according to an illustrative embodiment. Process 800 is across the platforms of a plurality of logical partitioned platforms, such as logical partitioned platform 600 and logical partitioned platform 620 of FIG. 6.

Process 800 begins by mounting a temporary storage to the partition management firmware of the source cloud on a separate temporary storage to the destination cloud (step 802). The temporary storage can be temporary data store 634 and temporary data store 636 of FIG. 6. In one illustrative embodiment, the temporary shared storages are network file system server images physically located at each of the source cloud and the destination cloud.

Process 800 then sets up asynchronous mirroring between the two separate temporary storages (step 804). The temporary storage at the source cloud is set up as the source temporary storage. The temporary storage at the destination cloud is set up as the destination temporary storage.

Process 800 then performs a storage location migration of a virtual machine from the source cloud to the temporary storage at the source cloud (step 806). The disk files of the virtual machine being transferred are migrated from data store to the source temporary storage while the transferred virtual machine is running. The storage location migration can be performed according to a method described in FIG. 4. As disk files of the virtual machine being transferred are migrated from data store to the temporary storage, process 800 asynchronously mirrors the transferred disk files to the temporary storage at the destination cloud (step 808).

Process 800 then transfers operation of the virtual machine being transferred from the source cloud to the destination cloud (step 810). Partition management firmware of the source cloud suspends operation of the virtual machine being transferred, committing the image and memory of the virtual machine to the source temporary storage. The image and memory of the virtual machine are asynchronously mirrored to the destination temporary storage. The virtual machine is then restarted in the destination cloud, using the image and memory within the destination temporary storage.

Process 800 then performs a storage location migration of the virtual machine from the destination temporary storage to the final destination storage in the destination cloud (step 812). In one illustrative embodiment, the final destination storage is local storage attached to a logically partitioned platform in the destination cloud. The disk files of the virtual machine being transferred are migrated from the destination temporary storage to partition of the data store on the destination cloud. The migration occurs while the transferred virtual machine is running. The storage location migration can be performed according to a method described in FIG. 4.

Process 800 then determines if there are any additional virtual machines to be migrated from the source cloud to the destination cloud (step 814). If the source cloud contains additional virtual machines to be migrated to the destination cloud ("yes" at step 814), process 800 iterates back to step 806 to migrate the remaining clouds. Otherwise, process 800 proceeds to step 816.

Responsive to determining that the source cloud does not contain additional virtual machines to be migrated to the destination cloud, ("no" at step 814), process 800 unmounts the temporary storages from the partition management firmware of the source cloud and the partition management firmware of the destination cloud (step 816). Process 800 then removes any remaining temporary storage image from the destination cloud (step 818). In one illustrative embodiment, the temporary storages are network file system server images located at the source cloud and the destination cloud. Process 800 removes these network file system server image. Process 800 terminates thereafter.

The illustrative embodiments describe a computer implemented method for migrating a virtual machine between a source cloud and a destination cloud. At least one temporary storage is mounted to a partition management firmware of the source cloud and to a partition management firmware of the destination cloud. A first storage location migration is performed migrating the virtual machine from the source cloud to the at least one temporary storage. A second storage location migration is performed migrating the virtual machine from the at least one temporary storage to local storage of the destination cloud. The at least one temporary storage is then umounted from the partition management firmware of the source cloud and from the partition management firmware of the destination cloud.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order best to explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for migrating a virtual machine between a source cloud and a destination cloud, the method comprising:
    mounting at least one temporary storage to a partition management firmware of the source cloud and to a partition management firmware of the destination cloud;
    performing a first storage location migration of the virtual machine from the source cloud to the at least one temporary storage;
    performing a second storage location migration of the virtual machine from the at least one temporary storage to final destination storage of the destination cloud; and
    unmounting at least one temporary storage from the partition management firmware of the source cloud and from the partition management firmware of the destination cloud.

2. The computer implemented method of claim 1 further comprising:
    creating a virtual private network between the source cloud and the destination cloud; and
    mounting the at least one temporary storage to the partition management firmware of the source cloud and to the partition management firmware of the destination cloud, wherein at least one temporary storage is a single temporary storage.

3. The computer implemented method of claim 2 further comprising:
    responsive to performing a first storage location migration of the virtual machine from the source cloud to the at least one temporary storage, performing a memory state migration of the virtual machine from the partition management firmware of the source cloud to the partition management firmware of the destination cloud; and
    wherein the step of performing the second storage location migration of the virtual machine from the at least one temporary storage to final destination storage of the destination cloud is responsive to performing the memory state migration of the virtual machine from the partition management firmware of the source cloud to the partition management firmware of the destination cloud.

4. The computer implemented method of claim 3, wherein the step of performing a memory state migration further comprises:
    recording the entire state of the virtual machine in a set of files;
    storing the set of files on the at least one temporary storage;
    transferring an active memory and an execution state of the virtual machine to the partition management firmware of the destination cloud;
    tracking on-going memory transactions in a bitmap;
    suspending operation of the virtual machine within a source partition of the source cloud;
    copying the bitmap to a destination partition of the destination cloud; and
    resuming operation of the virtual machine within the new partition.

5. The computer implemented method of claim 1, wherein the step of performing the first storage location migration further comprises:
    moving a home directory of the virtual machine from the source cloud to the at least one temporary storage;
    copying contents of storage disk file of the virtual machine from the source cloud to the at least one temporary storage;
    records regions of the storage disk file that are written to during copying of the contents of the storage disk file of the virtual, wherein the regions are recorded to a changed block tracking file;
    copying contents of storage disk file indicated by the changed block tracking file the source cloud to the at least one temporary storage;
    suspending operation of the virtual machine; and
    resuming operation of the virtual machine.

6. The computer implemented method of claim 1 further comprising:
    mounting the at least one temporary storage to the partition management firmware of the source cloud and to the partition management firmware of the destination cloud, wherein the at least one temporary storage comprises a first temporary storage mounted to the partition management firmware of the source cloud and a second temporary storage mounted to the partition management firmware of the destination cloud;
    asynchronous mirroring from the first temporary storage to the second temporary storage; and
    responsive to performing the first storage location migration of the virtual machine from the source cloud to the at least one temporary storage, transferring operation of the virtual machine from the source cloud to the destination cloud.

7. The computer implemented method of claim 6, wherein the step of transferring operation of the virtual machine from the source cloud to the destination cloud further comprises:
    suspending operation of the virtual machine at the source cloud;
    storing an image and memory of the virtual machine to a first temporary storage;
    asynchronously mirroring the image and memory of the virtual machine to the second temporary storage; and
    restarting the virtual machine in the destination cloud, using the image and the memory of the virtual machine stored within the within the second temporary storage.

8. The computer implemented method of claim 1, wherein various optimizations are introduced during the migration, the optimizations selected from the list consisting of:
    enabling a guest operating system to be used by a file system, performing data compression during migration, performing an image duplication across multiple images, reordering a plurality of virtual machine disks to be migrated, and combinations thereof.

9. A data processing system comprising:
    a storage having a computer usable program code stored thereof for migrating a virtual machine between a source cloud and a destination cloud;
    a bus system connecting the storage to a processor; and
    a processor, wherein the processor executes the computer usable program code: to mount at least one temporary storage to a partition management firmware of the source cloud and to a partition management firmware of the destination cloud; to perform a first storage location migration of the virtual machine from the source cloud to the at least one temporary storage; to perform a second storage location migration of the virtual machine from the at least one temporary storage to final destination storage of the destination cloud; and to unmount the at least one temporary storage from the partition management firmware of the source cloud and from the partition management firmware of the destination cloud.

10. The data processing system of claim 9, wherein the processor further executes the computer usable program code:

to create a virtual private network between the source cloud and the destination cloud; and to mount the at least one temporary storage to a partition management firmware of the source cloud and to a partition management firmware of the destination cloud, wherein the at least one temporary storage is a single temporary storage.

11. The data processing system of claim 10, wherein the processor further executes the computer usable program code:

responsive to performing the first storage location migration of the virtual machine from the source cloud to the at least one temporary storage, to perform a memory state migration of the virtual machine from the partition management firmware of the source cloud to the partition management firmware of the destination cloud; and wherein the processor executing the computer usable program code to perform the second storage location migration of the virtual machine from the at least one temporary storage to final destination storage of the destination cloud is responsive to the processor executing the computer usable program code to perform the memory state migration of the virtual machine from the partition management firmware of the source cloud to the partition management firmware of the destination cloud.

12. The data processing system of claim 9, wherein the processor executing the computer usable program code to perform the first storage location migration further comprises the processor executing the computer usable program code:

to move a home directory of the virtual machine from the source cloud to the at least one temporary storage; to copy contents of storage disk file of the virtual machine from the source cloud to the at least one temporary storage; to record regions of the storage disk file that are written to during copying of the contents of the storage disk file of the virtual, wherein the regions are recorded to a changed block tracking file; to copy contents of storage disk file indicated by the changed block tracking file the source cloud to the at least one temporary storage; to suspend operation of the virtual machine; and to resume operation of the virtual machine.

13. The data processing system of claim 12, wherein the processor executing the computer usable program code to perform the memory state migration further comprises the processor executing the computer usable program code:

to record the entire state of the virtual machine in a set of files; to store the set of files on the at least one temporary storage; to transfer an active memory and an execution state of the virtual machine to the partition management firmware of the destination cloud; to track on-going memory transactions in a bitmap; to suspend operation of the virtual machine within a source partition of the source cloud; to copy the bitmap to the destination partition of the destination cloud; and to resume operation of the virtual machine within the new partition.

14. The data processing system of claim 9, wherein the processor further executes the computer usable program code:

to mount the at least one temporary storage to the partition management firmware of the source cloud and to the partition management firmware of the destination cloud, wherein the at least one temporary storage comprises a first temporary storage mounted to the partition management firmware of the source cloud and a second temporary storage mounted to the partition management firmware of the destination cloud; and to asynchronous mirror from the first temporary storage to the second temporary storage.

15. The data processing system of claim 14, wherein the processor further executes the computer usable program code:

responsive to performing the first storage location migration of the virtual machine from the source cloud to the at least one temporary storage, to transfer operation of the virtual machine from the source cloud to the destination cloud.

16. The data processing system of claim 15, wherein the processor executing the computer usable program code to transfer operation of the virtual machine from the source cloud to the destination cloud further comprises the processor executing the computer usable program code:

to suspending operation of the virtual machine at the source cloud; to store an image and memory of the virtual machine to a first temporary storage; to asynchronously mirror the image and memory of the virtual machine to the second temporary storage; and to restart the virtual machine in the destination cloud, using the image and the memory of the virtual machine stored within the within the second temporary storage.

17. The data processing system of claim 9, wherein the processor further executes the computer usable program code to introduce various optimizations during the migration, the optimizations selected from the list consisting of: enabling a guest operating system to be used by a file system, performing data compression during migration, performing an image duplication across multiple images, reordering a plurality of virtual machine disks to be migrated, and combinations thereof.

18. A non-transitory computer-readable storage medium having computer executable instructions encoded thereon for migrating a virtual machine between a source cloud and a destination cloud, the computer-readable medium comprising:

instructions for mounting at least one temporary storage to a partition management firmware of the source cloud and to a partition management firmware of the destination cloud;

instructions for performing a first storage location migration of the virtual machine from the source cloud to the at least one temporary storage;

instructions for performing a second storage location migration of the virtual machine from the at least one temporary storage to final destination storage of the destination cloud; and instructions for unmounting the at least one temporary storage from the partition management firmware of the source cloud and from the partition management firmware of the destination cloud.

19. The non-transitory computer-readable storage medium of claim 18 further comprising:

instructions for creating the virtual private network between the source cloud and the destination cloud; and mounting the at least one temporary storage to the partition management firmware of the source cloud and to the partition management firmware of the destination cloud, wherein the at least one temporary storage is a single temporary storage.

20. The non-transitory computer-readable storage medium of claim 19 further comprising:

instructions, responsive to performing the first storage location migration of the virtual machine from the source cloud to the at least one temporary storage, for performing a memory state migration of the virtual machine from the partition management firmware of the source cloud to the partition management firmware of the destination cloud; and wherein the instructions for performing the second storage location migration of the virtual machine from the at least one temporary storage to final destination storage of the destination cloud is responsive to performing the memory state migration of the virtual machine from the partition management firmware of the source cloud to the partition management firmware of the destination cloud.

21. The non-transitory computer-readable storage medium of claim 18, wherein the instructions for performing the first storage location migration further comprises:

instructions for moving a home directory of the virtual machine from the source cloud to the at least one temporary storage;

instructions for copying contents of storage disk file of the virtual machine from the source cloud to the at least one temporary storage;

instructions for records regions of the storage disk file that are written to during copying of the contents of the storage disk file of the virtual, wherein the regions are recorded to a changed block tracking file;

instructions for copying contents of storage disk file indicated by the changed block tracking file the source cloud to the at least one temporary storage;

instructions for suspending operation of the virtual machine; and instructions for resuming operation of the virtual machine.

22. The non-transitory computer-readable storage medium of claim 21, wherein the instructions for performing a memory state migration further comprises:

instructions for recording the entire state of the virtual machine in a set of files;

instructions for storing the set of files on the at least one temporary storage;

instructions for transferring an active memory and an execution state of the virtual machine to the partition management firmware of the destination cloud;

instructions for tracking on-going memory transactions in a bitmap;

instructions for suspending operation of the virtual machine within the source partition of the source cloud;

instructions for copying the bitmap to a destination partition of the destination cloud; and instructions for resuming operation of the virtual machine within the new partition.

23. The non-transitory computer-readable storage medium of claim 18 further comprising:

instructions for mounting the at least one temporary storage to the partition management firmware of the source cloud and to the partition management firmware of the destination cloud, wherein the at least one temporary storage comprises a first temporary storage mounted to the partition management firmware of the source cloud and a second temporary storage mounted to the partition management firmware of the destination cloud; and instructions for asynchronous mirroring from the first temporary storage to the second temporary storage.

24. The non-transitory computer-readable storage medium of claim 23 further comprising:

instructions, responsive to performing the first storage location migration of the virtual machine from the source cloud to the at least one temporary storage, for transferring operation of the virtual machine from the source cloud to the destination cloud.

25. The non-transitory computer-readable storage medium of claim 24, wherein the instructions for transferring operation of the virtual machine from the source cloud to the destination cloud further comprises:

instructions for suspending operation of the virtual machine at the source cloud;

instructions for storing an image and memory of the virtual machine to a first temporary storage;

instructions for asynchronously mirroring the image and memory of the virtual machine to the second temporary storage; and instructions for restarting the virtual machine in the destination cloud, using the image and the memory of the virtual machine stored within the within the second temporary storage.

* * * * *